United States Patent
Kwon

(10) Patent No.: US 10,964,303 B2
(45) Date of Patent: Mar. 30, 2021

(54) VEHICULAR APPARATUS AND METHOD FOR ACTIVE NOISE CONTROL, AND VEHICLE INCLUDING VEHICULAR APPARATUS

(71) Applicants: Hyundai Motor Company, Seoul (KR); Kia Motors Corporation, Seoul (KR)

(72) Inventor: Byoung Ho Kwon, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 9 days.

(21) Appl. No.: 16/511,849

(22) Filed: Jul. 15, 2019

(65) Prior Publication Data
US 2020/0327876 A1    Oct. 15, 2020

(30) Foreign Application Priority Data
Apr. 10, 2019   (KR) .................. 10-2019-0041810

(51) Int. Cl.
*G10K 11/178* (2006.01)
*B60W 30/20* (2006.01)
*G01H 1/12* (2006.01)

(52) U.S. Cl.
CPC .......... *G10K 11/178* (2013.01); *B60W 30/20* (2013.01); *G01H 1/12* (2013.01); *G10K 2210/129* (2013.01); *G10K 2210/1282* (2013.01)

(58) Field of Classification Search
CPC ......... G10K 11/178; G10K 2210/1282; G10K 2210/129; B60W 30/20; G01H 1/12
USPC ................................................ 381/71.1, 71.4
See application file for complete search history.

(56) References Cited

U.S. PATENT DOCUMENTS 5,910,993 A  * 6/1999 Aoki ................ G10K 11/17825
                                                              381/71.12
2016/0163304 A1 * 6/2016 Lee .................... G10K 11/1781
                                                              381/71.4

FOREIGN PATENT DOCUMENTS

| CN | 104035332 A | * | 9/2014 |
| JP | 2015169915 A | * | 9/2015 |
| KR | 20140121226 A |   | 10/2014 |

* cited by examiner

*Primary Examiner* — William A Jerez Lora
(74) *Attorney, Agent, or Firm* — Mintz Levin Cohn Ferris Glovsky and Popeo, P.C.; Peter F. Corless

(57) ABSTRACT

A vehicular apparatus for active noise control may include: a sensing unit configured to sense information characterizing at least one of an environment inside of a vehicle and an environment outside of the vehicle; and a controller configured extract road roughness information characterizing road roughness from the sensed information, to calculate a convergence coefficient based on the road roughness information, to generate a control signal by applying the convergence coefficient to a control filter coefficient, and to perform active noise control using the control signal.

18 Claims, 5 Drawing Sheets

VEHICULAR APPARATUS AND METHOD FOR ACTIVE NOISE CONTROL, AND VEHICLE INCLUDING VEHICULAR APPARATUS

CROSS-REFERENCE TO RELATED APPLICATION

This application claims the benefit of priority to Korean Patent Application No. 10-2019-0041810, filed on Apr. 10, 2019, which is hereby incorporated by reference as if fully set forth herein.

BACKGROUND OF THE DISCLOSURE

Technical Field

The present disclosure relates to a vehicular apparatus for active noise control, and more particularly, to a vehicular apparatus and method for active noise control, and a vehicle including the vehicular apparatus for active noise control providing adaptability to changes in driving condition.

Discussion of the Related Art

In general, noise in a vehicle during driving may be caused by a wide range of factors such as engine operation, a curve in the road, wind, and so on. There are various methods for reducing in-vehicle noise including an inactive noise control method of reducing noise via a sound absorbing material installed in a vehicle to absorb in-vehicle noise and an active noise control method of outputting a control signal that is an out-of-phase with the noise signal in order to reduce the noise signal.

Another active noise control method includes reducing road noise due to friction between vehicle tires and a road by generating a noise control signal using vibration transmitted to the vehicle through a tire and an indoor noise signal. The noise control signal may be reproduced through a speaker, thereby reducing in-vehicle noise. The active noise control system may generate the noise control signal using an optimal filter. Depending on a convergence degree of the optimal filter, noise control performance may be changed.

The convergence degree of the optimal filter may be determined in consideration of the stability and control adaptability of a controller and may vary the noise control performance of the active control system. Accordingly, to ensure the highest noise control performance by the active control system, the optimal filter needs to converge on an optimal filter value and, to this end, the vehicle needs to be continuously driven in the same environmental conditions. That is, when the vehicle is driven on the same road at a constant speed for a period of time, e.g., several seconds to several minutes, the optimal filter of the active control system may converge on the optimal filter value to achieve the highest noise control performance.

However, while average noise control performance may be ensured in general driving conditions, optimum noise control performance may not be possible in sub-optimal driving conditions, e.g., where the road and speed change. In particular, when driving on a road with roughness constantly changing, it is impossible in practice to achieve the highest control performance using conventional active control methods. Accordingly, there is a need to develop a vehicular active noise control apparatus that is rapidly adaptable to changes in driving conditions to achieve optimum noise control performance across all conditions.

SUMMARY OF THE DISCLOSURE

Accordingly, the present disclosure is directed to a vehicular apparatus and method of active noise control, and a vehicle including the vehicular apparatus that substantially obviates one or more problems due to limitations and disadvantages of the related art.

An object of the present disclosure is to provide a vehicular apparatus and method of active noise control, and a vehicle including the vehicular apparatus, which updates a convergence coefficient based on road roughness and applies the updated convergence coefficient to a control filter coefficient to generate a control signal. As a result, the vehicular apparatus and method of active noise control may be rapidly adaptable to changes in various driving conditions, such as changes in road roughness, thereby achieving optimum noise control performance in spite of sub-optimal driving conditions.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with embodiments of the disclosure, a vehicular apparatus for active noise control may include: a sensing unit configured to sense information characterizing at least one of an environment inside of a vehicle and an environment outside of the vehicle; and a controller configured extract road roughness information characterizing road roughness from the sensed information, to calculate a convergence coefficient based on the road roughness information, to generate a control signal by applying the convergence coefficient to a control filter coefficient, and to perform active noise control using the control signal.

Furthermore, in accordance with embodiments of the present disclosure, an active noise control method of a vehicular active noise control apparatus may include: sensing, by a sensing unit, information characterizing at least one of an environment inside of a vehicle and an environment outside of the vehicle; extracting, by the controller, road roughness information characterizing road roughness from the sensed information; determining, by the controller, whether a variation in the road roughness characterized by the road roughness information is greater than a reference variation; when the variation in the road roughness is greater than the reference variation, calculating, by the controller, a convergence coefficient corresponding to the variation in the road roughness; applying, by the controller, a vibration and noise signal and the convergence coefficient to a control filter coefficient, thereby updating the control filter coefficient; and generating, by the controller, a control signal based on the updated control filter coefficient.

Furthermore, in accordance with embodiments of the present disclosure, an active noise control method of a vehicular active noise control apparatus may include: sensing, by the sensing unit, information characterizing at least one of an environment inside of a vehicle and an environment outside of the vehicle; extracting, by the controller, road roughness information characterizing road roughness from the sensed information; determining, by the controller, a variation in the road roughness based on the road roughness information; selecting, by the controller, an optimum convergence coefficient among the plurality of stored optimum convergence coefficients corresponding to the variation in the road roughness; setting, by the controller, a convergence coefficient as equal to the selected optimum convergence coefficient; applying, by the controller, a vibration and noise signal and the convergence coefficient to a control filter coefficient, thereby updating the control filter coefficient; and generating, by the controller, a control signal based on the updated control filter coefficient.

Furthermore, in accordance with embodiments of the present disclosure, a non-transitory computer readable recording medium may have recorded thereon a program for executing either of the above active noise control methods.

Furthermore, in accordance with embodiments of the present disclosure, a vehicle may include: a microphone configured to detect noise; an active noise control apparatus configured to perform active noise control in which the noise is actively controlled; an amplifier configured to amplify the actively controlled noise; and a speaker configured to output the amplified noise. The active noise control apparatus may include: a sensing unit configured to sense information characterizing at least one of an environment inside of a vehicle and an environment outside of the vehicle; and a controller configured to extract road roughness information characterizing road roughness from the sensed information, to calculate a convergence coefficient based on the road roughness information, to generate a control signal by applying the convergence coefficient to a control filter coefficient, and to perform the active noise control using the control signal.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Figure 1:
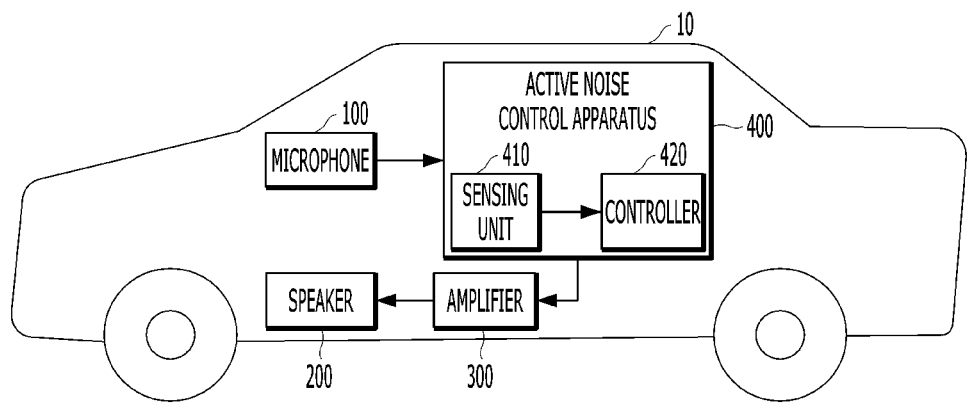
FIG. 1 is a schematic diagram for explanation of a vehicle including an active noise control apparatus according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Exemplary embodiments of the present disclosure are described in detail so as for those of ordinary skill in the art to easily implement the disclosure with reference to the accompanying drawings. However, the present disclosure may be implemented in various different forms and is not limited to these embodiments. To clearly describe the present disclosure, parts unrelated to the description are omitted in the drawings and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, a vehicular apparatus and method for active noise control and a vehicle including the apparatus, applicable to embodiments of the present disclosure, will be described in detail with reference to FIGS. 1 to 8.

FIG. 1 is a schematic diagram for explanation of a vehicle including an active noise control apparatus according to embodiments of the present disclosure.

As shown in FIG. 1, a vehicle 10 according to the present disclosure may include a microphone 100 to which noise is introduced, an active noise control apparatus 400 for performing active noise control in response to the noise, an amplifier 300 for amplifying the actively controlled noise, and a speaker 200 for outputting the amplified noise.

Here, the active noise control apparatus 400 may include a sensing unit 410 for sensing vibration, noise, and driving environment information of the vehicle 10, and a controller 420 for extracting road roughness information, which may characterize the roughness of a road, such as the road on which the vehicle 10 is traveling, from the driving environment information, updating a convergence coefficient based on the extracted road roughness information, and applying the updated convergence coefficient to a control filter coefficient to generate a control signal, and a controller 420 for active noise control using the generated control signal.

The sensing unit 410 may include a vibration sensor for sensing vibration of a vehicle, a noise sensor for sensing noise of the vehicle, and a vision sensor for sensing a driving environment of the vehicle.

For example, the vision sensor may sense a driving road state of a part in front of a vehicle from the driving environment of the vehicle.

Then, the controller 420 may extract road roughness information from the driving environment information.

Here, the controller 420 may extract information characterizing a road part corresponding to a specific section from image information of a driving road of the part in front of a vehicle from the driving environment information and may extract road roughness information of the corresponding road part.

For example, the road part corresponding to the specific section may be a road including at least one of a step difference and a Belgian road but, is not limited thereto.

Then, the controller 420 may update and predict the convergence coefficient according to a variation in road roughness based on the extracted road roughness information.

Here, upon receiving information characterizing the road roughness, the controller 420 may determine whether the variation in road roughness is greater than a reference variation.

When the variation in road roughness is greater than the reference variation, the controller 420 may update the convergence coefficient corresponding to the variation in road roughness or, when the variation in road roughness is less than or equal to the reference variation, the controller 420 may set the convergence coefficient to an initial setting value.

Here, when updating the convergence coefficient corresponding to the variation in road roughness, the controller 420 may update the convergence coefficient according to the equation "$\mu(n)=\mu+\beta|\Delta v|$" ($\mu(n)$ being an updated convergence coefficient, $\mu$ being an initial setting convergence coefficient, and $\beta|\Delta v|$ being a variation in road roughness).

That is, when updating the convergence coefficient corresponding to the variation in road roughness, the controller 420 may perform update to increase the convergence coefficient in proportion to the variation in road roughness.

In another case, the controller 420 may establish a plurality of optimum convergence coefficients corresponding to variations in road roughness, respectively, may store the plurality of optimum convergence coefficients in a database, may determine the variation in road roughness upon receiving the information characterizing the road roughness, and may then also select an optimum convergence coefficient corresponding to the determined variation in road roughness from the database and may update the optimum convergence coefficient.

Then, the controller 420 may include an active noise controller for applying the updated convergence coefficient or a convergence coefficient of a reference setting value to the control filter coefficient to generate a control signal upon receiving a vibration and noise signal.

That is, upon receiving the vibration and noise signal, the controller 420 may apply the updated convergence coefficient to the control filter coefficient to update the control filter coefficient and may generate the control signal based on the control filter coefficient to which the updated convergence coefficient is applied.

Here, when updating the control filter coefficient, the controller 420 may update the control filter coefficient according to the equation "$w(n+1)=w(n)+\mu(n)x'(n)e(n)$" ($w(n+1)$ being an updated control filter coefficient, $w(n)$ being a current control filter coefficient, $\mu(n)$ being an updated convergence coefficient, $x'(n)$ being a vibration signal, and $e(n)$ being a noise signal).

When generating the control signal, the controller 420 may generate the control signal according to the equation "$y(n)=w(n)x'(n)$" ($y(n)$ being a control signal, $w(n)$ being a current control filter coefficient, and $x'(n)$ being a vibration signal).

As such, the present disclosure may update a convergence coefficient based on road roughness and may apply the updated convergence coefficient to a control filter coefficient to generate a control signal and, thus, may be rapidly adaptable to changes various driving conditions with changed road roughness, thereby embodying optimum noise control performance.

That is, the present disclosure may be rapidly adaptable to changes in driving conditions that causes a change in road noise such as a change in road roughness, using a vision sensor installed in an autonomous vehicle, thereby embodying optimum control performance.

As such, the present disclosure may embody optimum control performance based on changes in driving conditions such as a road or a vehicle speed.

In particular, the present disclosure may apply road characteristics to embody optimum control performance when a vehicle is driven on a particular road (a step difference or a Belgian road).

Figure 2:
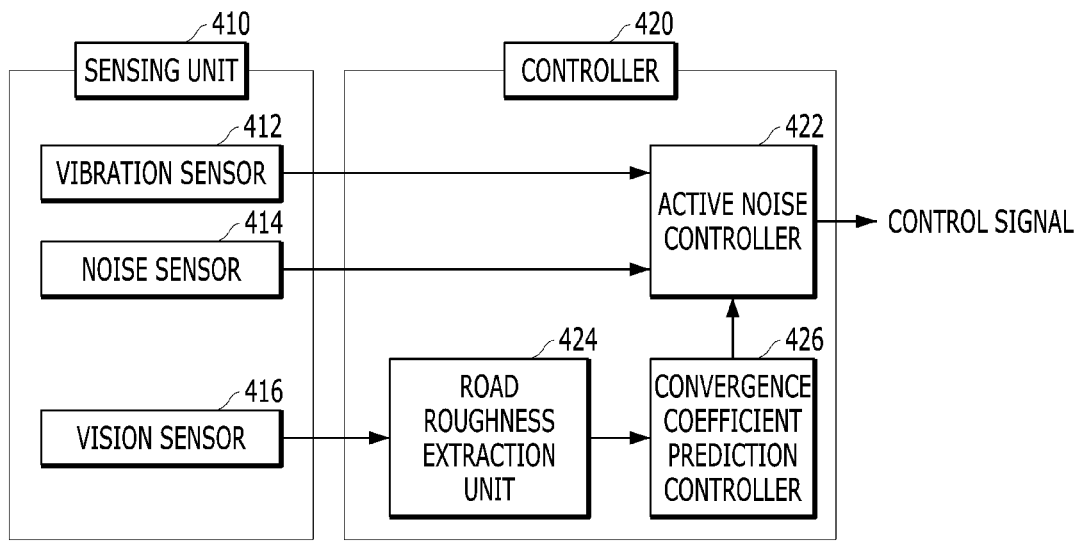
FIG. 2 is a block diagram for explanation of the configuration of a vehicular active noise control apparatus according to embodiments of the present disclosure.

FIG. 2 is a block diagram for explanation of the configuration of a vehicular active noise control apparatus according to embodiments of the present disclosure.

As shown in FIG. 2, the present disclosure may include the sensing unit 410 for sensing vibration, noise, and the driving environment of a vehicle and the controller 420 for generating a control signal based on the sensed vibration, noise, and driving environment information to perform active noise control.

Here, the sensing unit 410 may include a vibration sensor 412 for sensing vibration of a vehicle, a noise sensor 414 for sensing for sensing noise of the vehicle, and a vision sensor 416 for sensing the driving environment of the vehicle.

For example, the vision sensor 416 may sense a driving road state of the part in front of a vehicle from the driving environment of the vehicle.

The controller 420 may include a road roughness extraction unit 424 for extracting information characterizing road roughness ("road roughness information") from the driving environment information, a convergence coefficient prediction controller 426 for updating and predicting a convergence coefficient depending on a variation in road roughness based on the extracted information characterizing road roughness, and an active noise controller 422 for applying the predicted convergence coefficient to a control filter coefficient to generate a control signal upon receiving a vibration and noise signal.

For example, the convergence coefficient prediction controller 426 may perform a first method of updating a convergence coefficient based on a variation in road roughness or a second method of establishing a plurality of optimum convergence coefficients corresponding to variations in road roughness, each of the optimum convergence coefficients being stored in a database, through testing or the like, and updating the convergence coefficient in real-time with respect to the variation in road roughness.

In the case of the first method, upon receiving the road roughness, the convergence coefficient prediction controller 426 may determine whether the variation in road roughness is greater than the reference variation and may update the convergence coefficient corresponding to the variation in road roughness when the variation in road roughness is greater than the reference variation, or may set the convergence coefficient to an initial setting value when the variation in road roughness is less than or equal to the reference variation.

Here, when updating the convergence coefficient corresponding to the variation in road roughness, the convergence coefficient prediction controller 426 may update the convergence coefficient according to the equation "$\mu(n)=\mu+\beta|\Delta v|$" ($\mu(n)$ being an updated convergence coefficient, $\mu$ being an initial setting convergence coefficient, and $\beta|\Delta v|$ being a variation in road roughness).

That is, when updating the convergence coefficient corresponding to the variation in road roughness, the convergence coefficient prediction controller 426 may perform update to increase the convergence coefficient in proportion to the variation in road roughness.

In the case of the second method, the convergence coefficient prediction controller 426 may establish a plurality of optimum convergence coefficients corresponding to variations in road roughness, respectively, each of the optimum convergence coefficients being stored in a database, may determine the variation in road roughness upon receiving the information characterizing the road roughness, may select an optimum convergence coefficient corresponding to the determined variation in road roughness from the database, and may update the optimum convergence coefficient.

Then, the active noise controller 422 may apply the updated convergence coefficient to a control filter coefficient to update a control filter coefficient upon receiving a vibration and noise signal and may generate a control signal based on the control filter coefficient to which the updated convergence coefficient is applied.

Here, when updating the control filter coefficient, the active noise controller 422 may update the control filter coefficient according to the equation "$w(n+1)=w(n)+\mu(n)x'(n)e(n)$" ($w(n+1)$ being an updated control filter coefficient, $w(n)$ being a current control filter coefficient, $\mu(n)$ being an updated convergence coefficient, $x'(n)$ being a vibration signal, and $e(n)$ being a noise signal).

When generating the control signal, the active noise controller 422 may generate the control signal according to the equation "$y(n)=w(n)x'(n)$" ($y(n)$ being a control signal, $w(n)$ being a current control filter coefficient, and $x'(n)$ being a vibration signal).

Figure 3:
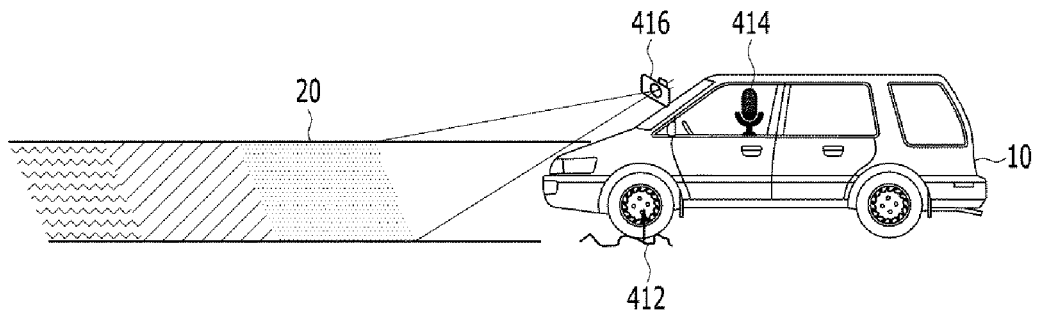
FIG. 3 is a diagram for explanation of a procedure of sensing a driving condition and environment of a vehicle according to embodiments of the present disclosure.

FIG. 3 is a diagram for explanation of a procedure of sensing a driving condition and environment of a vehicle according to the present disclosure.

As shown in FIG. 3, the present disclosure may include the vibration sensor 412 for sensing vibration of a vehicle, the noise sensor 414 for sensing noise of the vehicle, and the vision sensor 416 for sensing the driving environment of the vehicle.

The vision sensor 416 may sense a driving road state of a part in front of a vehicle from the driving environment of the vehicle.

In general, an active noise control method for reducing road noise of a vehicle generates a control signal using vibration transferred to a vehicle body through a tire and an indoor noise signal and reproduces the control signal through a speaker, thereby reducing noise.

A conventional control algorithm requires continuous driving in the same condition in order to obtain an optimum control filter and to ensure the highest control performance.

However, in general driving conditions, road roughness is changed as shown in FIG. 3 and, thus, it is impossible in practice to embody the highest control performance using a conventional active control method.

Accordingly, a control algorithm according to the present disclosure may extract a change in road roughness using a vision sensor installed to a vehicle and may predict and update a convergence coefficient using the extracted change in road roughness to enhance a control filter convergence speed in order to help autonomous driving or driving of a driver.

That is, the active noise control apparatus for reducing road noise according to the present disclosure may further include a vision sensor for measuring a vision signal, a road roughness extraction unit for extracting information characterizing road roughness from the vision signal of the vision sensor, and a convergence coefficient prediction controller for enhancing control convergence using the change in road roughness.

Figure 4:
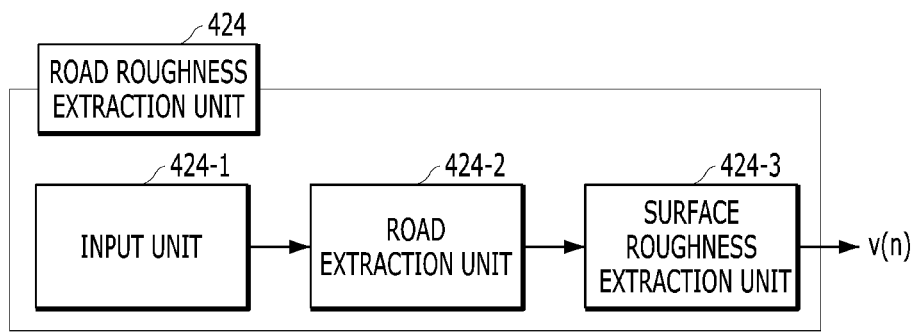
FIG. 4 is a block diagram for explanation of the configuration of the road roughness extraction unit of FIG. 2.

FIG. 4 is a block diagram for explanation of the configuration of the road roughness extraction unit of FIG. 2.

As shown in FIG. 4, the road roughness extraction unit 424 may include an input unit 424-1 to which driving environment information is input, a road extraction unit 424-2 for extracting information characterizing a road 20 from the driving environment information, and a surface roughness extraction unit 424-3 for extracting surface roughness of the extracted information of the road 20.

Here, the input unit 424-1 may receive image information characterizing a driving road of the part in front of a vehicle from the driving environment information.

The road extraction unit 424-2 may extract a road part corresponding to a specific section from the image information of the part in front of a vehicle from the driving environment information.

For example, the road part corresponding to the specific section may be a road including at least one of a step difference and a Belgian road but, is not limited thereto.

That is, the road roughness extraction unit 424 may receive a front part vision signal measured by the vision sensor, may extract information characterizing the road part corresponding to the specific section from the corresponding vision signal, and may recognize the roughness degree of the road from the extracted road image to output a corresponding value of road roughness v(n).

Figure 5:
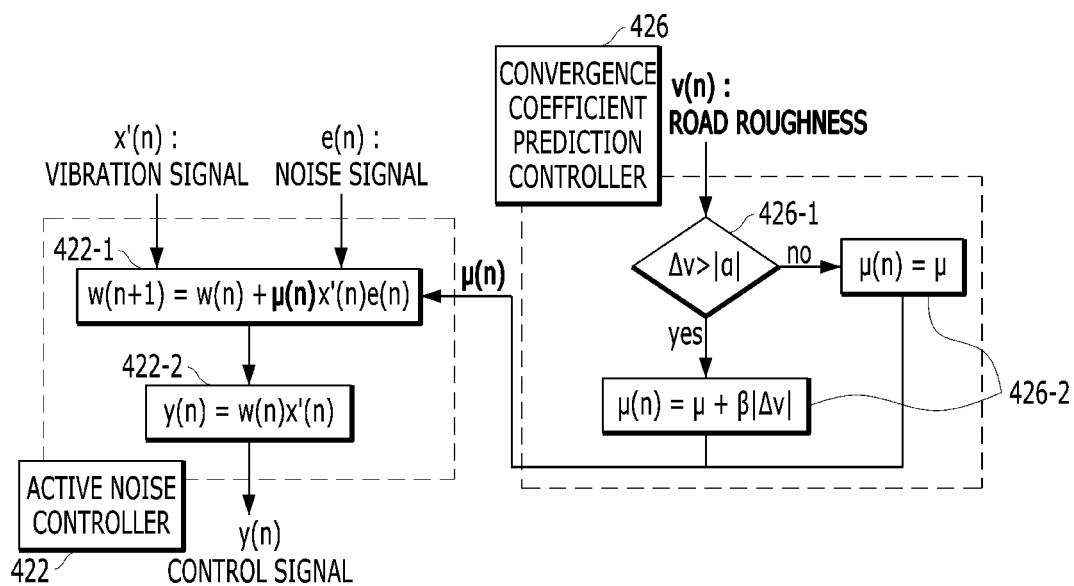
FIGS. 5 and 6 are block diagrams for explanation of the configuration of the convergence coefficient prediction controller and the active noise controller of FIG. 2.
Figure 6:
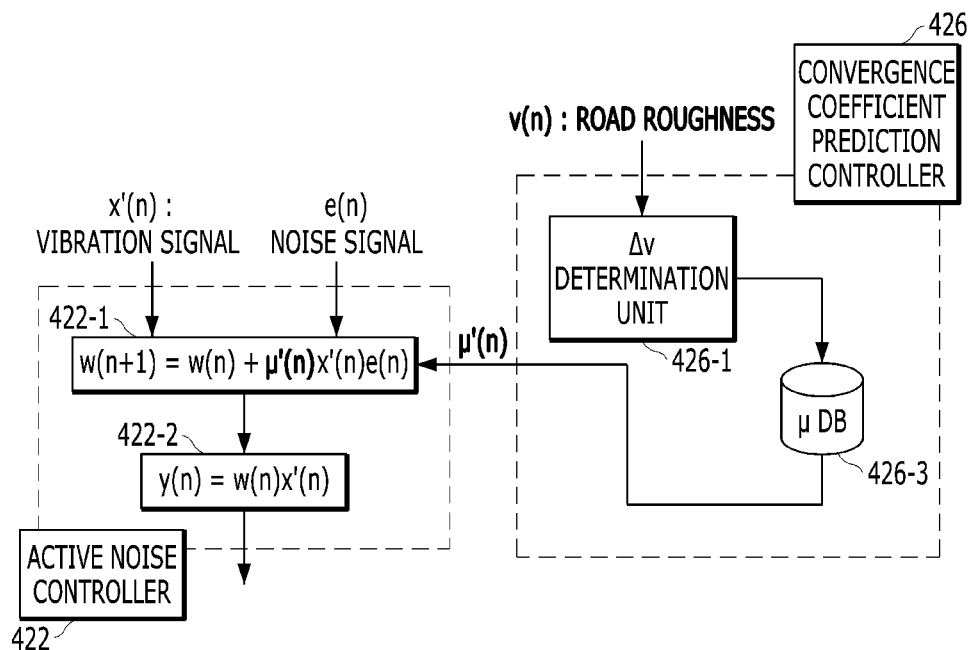

FIGS. 5 and 6 are block diagrams for explanation of the configuration of the convergence coefficient prediction controller and the active noise controller of FIG. 2.

FIG. 5 is a block diagram for explanation of the configuration of a convergence coefficient prediction controller and an active noise controller according to a first embodiment of the present disclosure.

As shown in FIG. 5, the convergence coefficient prediction controller 426 according to the first embodiment of the present disclosure may include a determination unit 426-1 and a convergence coefficient update unit 426-2.

Here, upon receiving road roughness v(n), the determination unit 426-1 may determine whether a variation Δv in road roughness is greater than a reference variation |α|.

When the variation Δv in road roughness is greater than the reference variation |α|, the convergence coefficient update unit 426-2 may update a convergence coefficient corresponding to a variation in road roughness or when the variation in road roughness is less than or equal to the reference variation, the convergence coefficient update unit 426-2 may set a convergence coefficient μ to an initial setting value.

The reference variation |α| may be an absolute value of a preset reference value.

When updating the convergence coefficient corresponding to the variation in road roughness, the convergence coefficient update unit 426-2 may update the convergence coefficient according to the equation "μ(n)=μ+β|Δv|" (μ(n) being an updated convergence coefficient, μ being an initial setting convergence coefficient, and β|Δv| being a variation in road roughness).

That is, when updating the convergence coefficient corresponding to the variation in road roughness, the convergence coefficient update unit 426-2 may perform update to increase the convergence coefficient in proportion to the variation in road roughness.

In addition, the active noise controller 422 may include a control filter update unit 422-1 and a control signal generation unit 422-2.

Here, upon receiving a vibration and noise signal, the control filter update unit 422-1 may apply the updated convergence coefficient to a control filter coefficient to update a control filter coefficient.

In this case, when updating the control filter coefficient, the control filter update unit 422-1 may update the control filter coefficient according to the equation "w(n+1)=w(n)+μ(n)x'(n)e(n)" (w(n+1) being an updated control filter coefficient, w(n) being a current control filter coefficient, μ(n) being an updated convergence coefficient, x'(n) being a vibration signal, and e(n) being a noise signal).

The control signal generation unit 422-2 may generate a control signal based on the control filter coefficient to which the updated convergence coefficient is applied.

Here, when generating the control signal, the control signal generation unit 422-2 may generate the control signal according to the equation "y(n)=w(n)x'(n)" (y(n) being a control signal, w(n) being a current control filter coefficient, and x'(n) being a vibration signal).

A conventional active noise control method may update a control filter coefficient depending on the magnitude of the vibration and noise signal using a fixed convergence coefficient μ.

In general, as the value of a convergence coefficient μ is increased, a control filter convergence speed is increased and converges on an optimum value within a short time but, the stability of a controller is degraded and, in the worst case, divergence of the controller occurs to thus generate abnormal noise.

Accordingly, as in a conventional active noise control method, when a convergence coefficient μ is set and fixed to an appropriate value, there is a problem in that a vehicle is not capable of rapidly adapting to changes in driving conditions that change road noise, such as changes in road roughness.

However, according to the present disclosure, a convergence coefficient may be updated depending on the driving situation using information characterizing road roughness without the use of a fixed convergence coefficient and, thus, a control filter convergence speed may be optimized.

That is, according to the first embodiment of the present disclosure, when a variation in road roughness that directly affects control performance is less than or equal to a predetermined magnitude, the convergence coefficient of an initial setting value may be used without changes and, when the variation in road roughness is greater than the predetermined magnitude, a convergence coefficient may be increased in proportion to the variation and, accordingly, a control filter convergence speed may be more rapidly improved.

FIG. 6 is a block diagram for explanation of the configuration of a convergence coefficient prediction controller and an active noise controller according to a second embodiment of the present disclosure.

As shown in FIG. 6, the convergence coefficient prediction controller 426 according to the second embodiment of the present disclosure may include a database 426-3 and the determination unit 426-1.

Here, the database 426-3 may establish and store an optimum convergence coefficient corresponding to a variation in road roughness in the form of a database.

Upon receiving information characterizing road roughness, the determination unit 426-1 may determine a variation in road roughness, may select an optimum convergence coefficient corresponding to the determined variation in road roughness from the database 426-3, and may update the optimum convergence coefficient.

In addition, the active noise controller 422 may include the control filter update unit 422-1 and the control signal generation unit 422-2.

Here, upon receiving a vibration and noise signal, the control filter update unit 422-1 may apply the updated convergence coefficient to a control filter coefficient to update the control filter coefficient.

In this case, when updating the control filter coefficient, the control filter update unit 422-1 may update the control filter coefficient according to the equation "w(n+1)=w(n)+μ(n)x'(n)e(n)" (w(n+1) being an updated control filter coefficient, w(n) being a current control filter coefficient, μ(n) being an updated convergence coefficient, x'(n) being a vibration signal, and e(n) being a noise signal).

The control signal generation unit 422-2 may generate a control signal based on the control filter coefficient to which the updated convergence coefficient is applied.

When generating the control signal, the control signal generation unit 422-2 may generate the control signal according to the equation "y(n)=w(n)x'(n)" (y(n) being a control signal, w(n) being a current control filter coefficient, and x'(n) being a vibration signal).

According to the second embodiment of the present disclosure, a plurality of optimum convergence coefficients corresponding to variations in road roughness, respectively, may be established through testing and stored in a database, and a convergence coefficient may be updated or set so as to equal a given optimum convergence coefficient based on the corresponding variation in road roughness, instead of a method of updating a convergence coefficient using road roughness in real-time using a specific conditional equation, as in the first embodiment.

Figure 7:
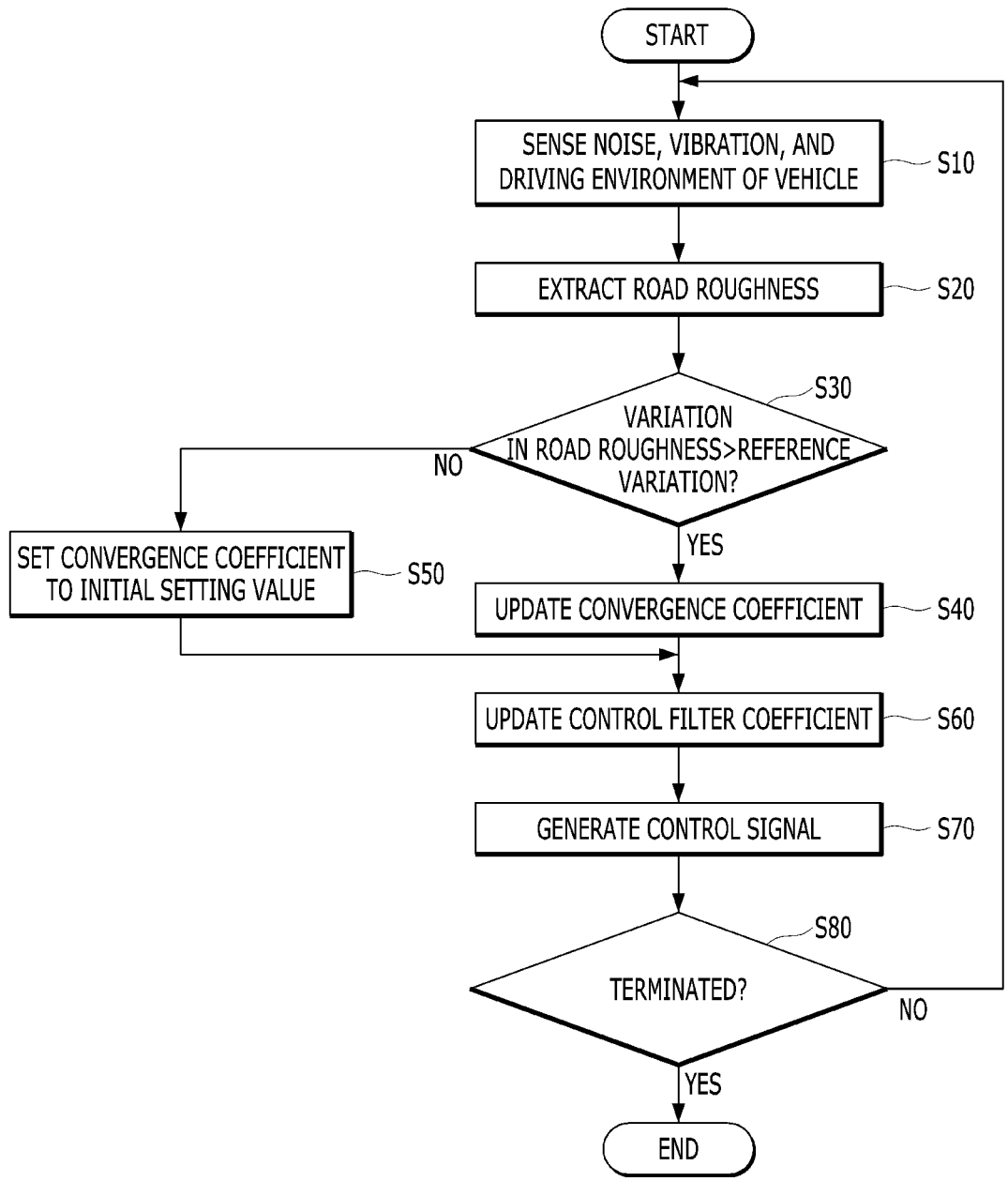
FIG. 7 is a flowchart for explanation of a vehicular active noise control method according to embodiments of the present disclosure.

FIG. 7 is a flowchart for explanation of a vehicular active noise control method according to embodiments of the present disclosure.

As shown in FIG. 7, according to the present disclosure, the vibration, noise, and driving environment of a vehicle may be sensed (S10).

Here, according to the present disclosure, a driving road state of a part in front of a vehicle from the driving environment of the vehicle may be sensed.

According to the present disclosure, road roughness may be extracted from the driving environment information (S20).

Here, according to the present disclosure, the extracting of road roughness from the driving environment information may include inputting driving environment information, extracting information characterizing a road from the driving environment information, and extracting surface roughness from the extracted information characterizing the road.

According to the present disclosure, in the inputting of the driving environment information, image information characterizing a driving road of the part in front of a vehicle from the driving environment information may be received.

According to the present disclosure, in the extracting the information characterizing the road from the driving environment information, information characterizing a road part corresponding to a specific section may be extracted from the image information characterizing the driving road of the part in front of a vehicle from the driving environment information.

Then, according to the present disclosure, whether the variation in road roughness is greater than the reference variation may be determined based on the extracted information characterizing the road roughness (S30).

Then, according to the present disclosure, when the variation in road roughness is greater than the reference variation, a convergence coefficient corresponding to the variation in road roughness may be updated (S40).

Here, according to the present disclosure, with regard to update of the convergence coefficient corresponding to the variation in road roughness, the convergence coefficient may be updated according to the equation "$\mu(n)=\mu+\beta|\Delta v|$" ($\mu(n)$ being an updated convergence coefficient, $\mu$ being an initial setting convergence coefficient, and $\beta|\Delta v|$ being a variation in road roughness).

According to the present disclosure, when the variation in road roughness is less than or equal to the reference variation, a convergence coefficient may be set to the initial setting value (S50).

According to the present disclosure, the vibration and noise signal and the updated convergence coefficient may be applied to a control filter coefficient to update the control filter coefficient (S60).

That is, according to the present disclosure, update may be performed to increase the convergence coefficient in proportion to the variation in road roughness.

Here, according to the present disclosure, with regard to update of the control filter coefficient, the control filter coefficient may be updated according to the equation "$w(n+1)=w(n)+\mu(n)x'(n)e(n)$" ($w(n+1)$ being an updated control filter coefficient, $w(n)$ being a current control filter coefficient, $\mu(n)$ being an updated convergence coefficient, $x'(n)$ being a vibration signal, and $e(n)$ being a noise signal).

Then, according to the present disclosure, a control signal may be generated based on the control filter coefficient to which the updated convergence coefficient is applied (S70).

Here, according to the present disclosure, with regard to the generation of a control signal, the control signal may be generated according to the equation "$y(n)=w(n)x'(n)$" ($y(n)$ being a control signal, $w(n)$ being a current control filter coefficient, and $x'(n)$ being a vibration signal).

Then, according to the present disclosure, whether active noise control is terminated may be determined (S80) and, when active noise control is determined to be terminated, the vehicular active noise control method may be terminated.

As such, according to the first embodiment of the present disclosure, when a variation in road roughness that directly affects control performance is less than or equal to a predetermined magnitude, a convergence coefficient of an initial setting value may be used without a change and, when the variation in road roughness is greater than the predetermined magnitude, a convergence coefficient may be increased in proportion to the variation and, accordingly, a control filter convergence speed may be more rapidly improved.

Figure 8:
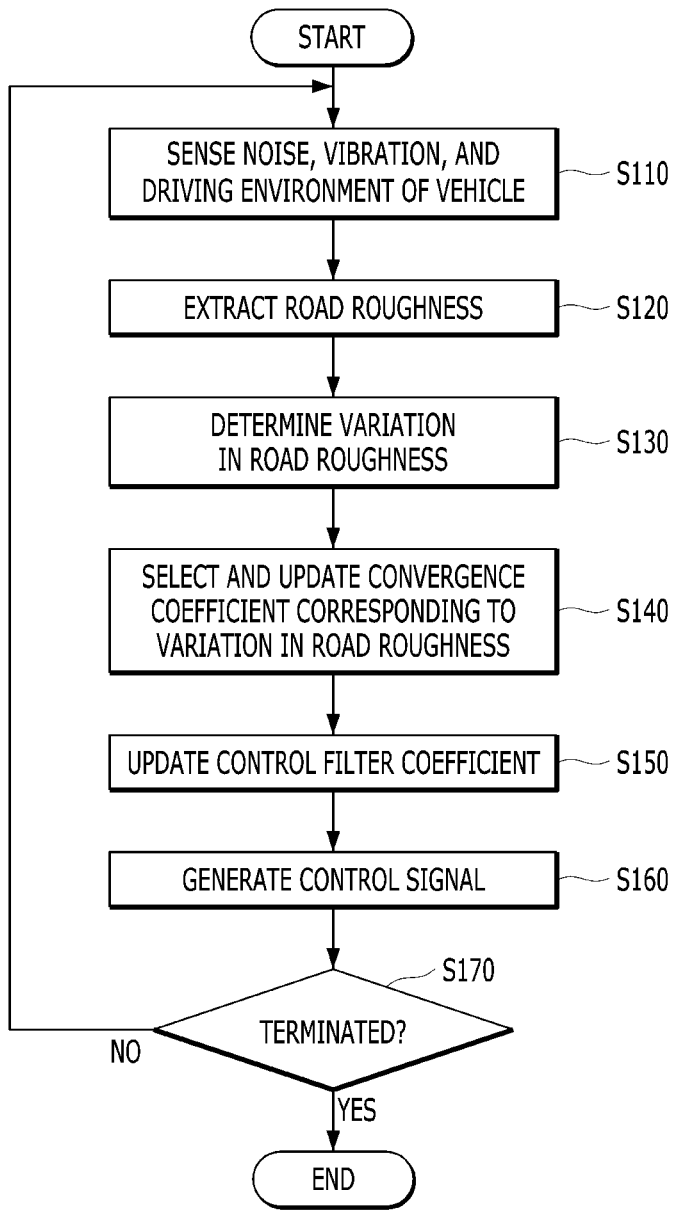
FIG. 8 is a flowchart for explanation of a vehicular active noise control method according to additional embodiments of the present disclosure.

FIG. 8 is a flowchart for explanation of a vehicular active noise control method according to additional embodiments of the present disclosure.

As shown in FIG. 8, according to the present disclosure, the vibration, noise, and driving environment of a vehicle may be sensed (S110).

Here, according to the present disclosure, the driving road state of a part in front of a vehicle from the driving environment of the vehicle may be sensed.

According to the present disclosure, road roughness may be extracted from the driving environment information (S120).

Here, according to the present disclosure, the extracting of road roughness from the driving environment information may include inputting driving environment information, extracting information characterizing a road from the driving environment information, and extracting surface roughness from the extracted information characterizing the road.

According to the present disclosure, in the inputting of the driving environment information, image information characterizing a driving road of the part in front of a vehicle from the driving environment information may be received.

According to the present disclosure, in the extracting the information characterizing the road from the driving environment information, information characterizing a road part corresponding to a specific section may be extracted from the image information characterizing the driving road of the part in front of a vehicle from the driving environment information.

Then, according to the present disclosure, the variation in road roughness may be determined based on the extracted road roughness (S130).

According to the present disclosure, a plurality of optimum convergence coefficients corresponding to the determined variation in road roughness may be selected from the database and updated (S140).

Here, the plurality of optimum convergence coefficients corresponding to a variation in road roughness may be established through testing and stored in a database.

Then, according to the present disclosure, the vibration and noise signal and the updated convergence coefficient may be applied to the control filter coefficient to update the control filter coefficient (S150).

That is, according to the present disclosure, update may be performed to increase the convergence coefficient in proportion to the variation in road roughness.

Here, according to the present disclosure, when updating a control filter coefficient, the control filter coefficient may be updated according to the equation "$w(n+1)=w(n)+\mu(n)x'(n)e(n)$" ($w(n+1)$ being an updated control filter coefficient, $w(n)$ being a current control filter coefficient, $\mu(n)$ being an updated convergence coefficient, $x'(n)$ being a vibration signal, and $e(n)$ being a noise signal).

Then, according to the present disclosure, the control signal may be generated based on the control filter coefficient to which the updated convergence coefficient is applied (S160).

Here, according to the present disclosure, when generating the control signal, the control signal may be generated according to the equation "$y(n)=w(n)x'(n)$" ($y(n)$ being a control signal, $w(n)$ being a current control filter coefficient, and $x'(n)$ being a vibration signal).

Then, according to the present disclosure, whether active noise control is terminated may be determined (S170) and, when active noise control is determined to be terminated, the vehicular active noise control method may be terminated.

As such, according to the second embodiment of the present disclosure, a plurality of optimum convergence coefficients corresponding to variations in road roughness, respectively, may be established through testing and stored in a database, and a convergence coefficient may be updated using the optimum convergence coefficients, instead of a method of updating a convergence coefficient using road roughness in real-time using a specific conditional equation, as in the first embodiment.

A vehicular apparatus and method for active noise control and a vehicle including the vehicular apparatus according to embodiments of the present disclosure may update a convergence coefficient based on road roughness and may apply the updated convergence coefficient to a control filter coefficient to generate a control signal and, thus, may be rapidly adaptable to changes in various driving conditions with changed road roughness, thereby achieving optimum noise control performance. As such, the present disclosure may enable rapid adaptation to changes in driving conditions that causes a change in road noise such as a change in road roughness using a vision sensor installed in an autonomous vehicle, thereby embodying optimum control performance.

The present disclosure may achieve optimum control performance based on changes in driving conditions such as a road or a vehicle speed. That is, the present disclosure may apply road characteristics to achieve optimum control performance regardless of the road on which the vehicle is driven.

It will be appreciated by persons skilled in the art that that the effects that could be achieved with the present disclosure are not limited to what has been particularly described hereinabove and other advantages of the present disclosure will be more clearly understood from the detailed description.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A vehicular apparatus for active noise control, the vehicular apparatus comprising:
   a sensing unit configured to sense information characterizing at least one of an environment inside of a vehicle and an environment outside of the vehicle; and
   a controller configured extract road roughness information characterizing road roughness from the sensed information, to calculate a convergence coefficient based on the road roughness information, to generate a control signal by applying the convergence coefficient to a control filter coefficient, and to perform active noise control using the control signal.

2. The vehicular apparatus of claim 1, wherein the sensing unit includes:
   a vibration sensor configured to sense vibration of the vehicle;
   a noise sensor configured to sense noise of the vehicle; and
   a vision sensor configured to acquire an image of a driving environment of the vehicle.

3. The vehicular apparatus of claim 2, wherein the vision sensor is configured to acquire an image characterizing a driving road state in front of the vehicle.

4. The vehicular apparatus of claim 1, wherein the controller includes:
   a road roughness extraction unit configured to extract the road roughness information from the sensed information;
   a convergence coefficient prediction controller configured to calculate the convergence coefficient based on a variation in the road roughness characterized by the road roughness information; and
   an active noise controller configured to generate the control signal, upon receiving a vibration and noise signal, by applying the convergence coefficient to the control filter coefficient.

5. The vehicular apparatus of claim 4, wherein the road roughness extraction unit includes:
   an input unit configured to receive driving environment information;
   a road extraction unit configured to extract information characterizing a road from the driving environment information; and
   a surface roughness extraction unit configured to extract information characterizing a surface roughness of the road.

6. The vehicular apparatus of claim 5, wherein the input unit is configured to extract image information characterizing a part of a road on which the vehicle is driving, the part of the road being in front of the vehicle, from the driving environment information.

7. The vehicular apparatus of claim 4, wherein the convergence coefficient prediction controller includes:
   a determination unit configured to determine whether the variation in the road roughness is greater than a reference variation; and
   a convergence coefficient update unit configured to calculate the convergence coefficient according to the variation in the road roughness when the variation in the road roughness is greater than the reference variation, or to set the convergence coefficient to an initial setting value when the variation in the road roughness is less than or equal to the reference variation.

8. The vehicular apparatus of claim 4, wherein the convergence coefficient prediction controller includes:
a database configured to store a plurality of optimum convergence coefficients corresponding to variations in the road roughness, respectively; and
a determination unit configured to determine the variation in the road roughness based on the road roughness information, to select from the database an optimum convergence coefficient corresponding to the variation in the road roughness, and to set the convergence coefficient as equal to the optimum convergence coefficient.

9. The vehicular apparatus of claim 4, wherein the active noise controller includes:
a control filter update unit configured to apply the convergence coefficient to the control filter coefficient, upon receiving the vibration and noise signal, thereby updating the control filter coefficient; and
a control signal generation unit configured to generate the control signal based on the updated control filter coefficient.

10. An active noise control method of a vehicular active noise control apparatus including a sensing unit and a controller, the active noise control method comprising:
sensing, by a sensing unit, information characterizing at least one of an environment inside of a vehicle and an environment outside of the vehicle;
extracting, by the controller, road roughness information characterizing road roughness from the sensed information;
determining, by the controller, whether a variation in the road roughness characterized by the road roughness information is greater than a reference variation;
when the variation in the road roughness is greater than the reference variation, calculating, by the controller, a convergence coefficient corresponding to the variation in the road roughness;
applying, by the controller, a vibration and noise signal and the convergence coefficient to a control filter coefficient, thereby updating the control filter coefficient; and
generating, by the controller, a control signal based on the updated control filter coefficient.

11. The active noise control method of claim 10, wherein the extracting of the road roughness information comprises:
receiving, by the controller, driving environment information;
extracting, by the controller, information characterizing a road from the driving environment information; and
extracting, by the controller, a surface roughness of the road.

12. The active noise control method of claim 11, wherein the receiving of the driving environment information comprises extracting, by the controller, image information characterizing a part of a road on which the vehicle is driving, the part of the road being in front of the vehicle, from the driving environment information.

13. The active noise control method of claim 10, wherein the determining of whether the variation in the road roughness is greater than the reference variation comprises setting, by the controller, the convergence coefficient to an initial setting value when the variation in the road roughness is less than or equal to the reference variation.

14. An active noise control method of a vehicular active noise control apparatus including a database storing a plurality of optimum convergence coefficients, a sensing unit, and a controller, the active noise control method comprising:
sensing, by the sensing unit, information characterizing at least one of an environment inside of a vehicle and an environment outside of the vehicle;
extracting, by the controller, road roughness information characterizing road roughness from the sensed information;
determining, by the controller, a variation in the road roughness based on the road roughness information;
selecting, by the controller, an optimum convergence coefficient among the plurality of stored optimum convergence coefficients corresponding to the variation in the road roughness;
setting, by the controller, a convergence coefficient as equal to the selected optimum convergence coefficient;
applying, by the controller, a vibration and noise signal and the convergence coefficient to a control filter coefficient, thereby updating the control filter coefficient; and
generating, by the controller, a control signal based on the updated control filter coefficient.

15. The active noise control method of claim 14, wherein the extracting of the road roughness information comprises:
receiving, by the controller, driving environment information;
extracting, by the controller, information characterizing a road from the driving environment information; and
extracting, by the controller, a surface roughness of the road.

16. The active noise control method of claim 15, wherein the receiving of the driving environment information comprises extracting, by the controller, image information characterizing a part of a road on which the vehicle is driving, the part of the road being in front of the vehicle, from the driving environment information.

17. A non-transitory computer readable recording medium having recorded thereon a program for executing the active noise control method of claim 14.

18. A vehicle including an active noise control apparatus, the vehicle comprising:
a microphone configured to detect noise;
an active noise control apparatus configured to perform active noise control in which the noise is actively controlled;
an amplifier configured to amplify the actively controlled noise; and
a speaker configured to output the amplified noise,
wherein the active noise control apparatus includes:
a sensing unit configured to sense information characterizing at least one of an environment inside of a vehicle and an environment outside of the vehicle; and
a controller configured to extract road roughness information characterizing road roughness from the sensed information, to calculate a convergence coefficient based on the road roughness information, to generate a control signal by applying the convergence coefficient to a control filter coefficient, and to perform the active noise control using the control signal.

* * * * *